(12) United States Patent
Landwehr et al.

(10) Patent No.: US 10,905,984 B2
(45) Date of Patent: Feb. 2, 2021

(54) METHOD AND APPARATUS FOR IMPROVED SOLID-LIQUID FILTRATION OF FILTER CAKES

(71) Applicant: Kronos International, Inc., Leverkusen (DE)

(72) Inventors: Frank Landwehr, Gladbeck (DE); Mitja Medved, Leverkusen (DE); Thomas Pierau, Leverkusen (DE)

(*) Notice: Subject to any disclaimer, the term of this patent is extended or adjusted under 35 U.S.C. 154(b) by 504 days.

(21) Appl. No.: 15/362,231

(22) Filed: Nov. 28, 2016

(65) Prior Publication Data

US 2017/0157541 A1    Jun. 8, 2017

(30) Foreign Application Priority Data

Dec. 3, 2015   (WO) ................ PCT/EP2015/002441

(51) Int. Cl.
| | | |
|---|---|---|
| *B01D 33/76* | (2006.01) | |
| *B01D 25/34* | (2006.01) | |
| *B01D 33/62* | (2006.01) | |
| *B01D 29/80* | (2006.01) | |
| *B01D 33/073* | (2006.01) | |
| *B01D 33/46* | (2006.01) | |

(52) U.S. Cl.
CPC .......... *B01D 33/766* (2013.01); *B01D 25/34* (2013.01); *B01D 25/346* (2013.01); *B01D 29/80* (2013.01); *B01D 33/073* (2013.01); *B01D 33/466* (2013.01); *B01D 33/62* (2013.01)

(58) Field of Classification Search
None
See application file for complete search history.

(56) References Cited

U.S. PATENT DOCUMENTS

| | | | | |
|---|---|---|---|---|
| 2,197,610 | A * | 4/1940 | Fedeler, Jr. ............ | B01D 33/09 137/624.13 |
| 2,374,114 | A * | 4/1945 | McBerty ................ | B01D 33/06 210/174 |
| 2,796,991 | A * | 6/1957 | Nyquist ................. | B01D 33/06 210/384 |
| 3,520,251 | A * | 7/1970 | Bodine .................... | B01J 19/10 100/118 |
| 3,622,005 | A * | 11/1971 | Kurita .................. | B01D 25/346 210/225 |
| 3,945,924 | A * | 3/1976 | Peterson .............. | B01D 33/048 210/384 |
| 4,166,034 | A * | 8/1979 | Bodine .................. | B01D 35/20 210/384 |
| 4,946,602 | A * | 8/1990 | Ekberg .................. | B01D 33/21 210/785 |

(Continued)

FOREIGN PATENT DOCUMENTS

| | | |
|---|---|---|
| DE | 1016239 | 9/1957 |
| DE | 1817789 | 3/1972 |

(Continued)

*Primary Examiner* — Robert J Popovics

(57) ABSTRACT

The invention is related to a method and vibratory apparatus for the improved solid-liquid filtration of filter cakes, especially for dewatering finely divided thixotropic filter cakes, with the aid of a vibratory apparatus. Further, the invention relates to a filtration apparatus having a vibratory apparatus as described herein, and to the use of the vibratory apparatus for the solid-liquid filtration of filter cakes.

7 Claims, 6 Drawing Sheets

(56) References Cited

U.S. PATENT DOCUMENTS

| | | | | |
|---|---|---|---|---|
| 5,607,588 A | * | 3/1997 | Peterson | B01D 29/6476 |
| | | | | 210/396 |
| 8,025,152 B2 | * | 9/2011 | Vasshus | B01D 33/03 |
| | | | | 209/307 |
| 9,427,780 B2 | * | 8/2016 | Houle | B01D 33/0376 |
| 9,486,835 B2 | * | 11/2016 | Kising | B07B 1/40 |
| 10,245,533 B2 | * | 4/2019 | Rhim | B01D 33/048 |
| 2005/0082234 A1 | * | 4/2005 | Solenthaler | B01D 33/0376 |
| | | | | 210/748.05 |
| 2017/0157541 A1 | * | 6/2017 | Landwehr | B01D 33/073 |

FOREIGN PATENT DOCUMENTS

| | | | | |
|---|---|---|---|---|
| DE | 4422503 | | 1/1996 | |
| EP | 3175900 A1 | * | 6/2017 | B01D 33/62 |
| WO | WO-2017092777 A1 | * | 6/2017 | B01D 33/62 |

* cited by examiner

METHOD AND APPARATUS FOR IMPROVED SOLID-LIQUID FILTRATION OF FILTER CAKES

RELATED APPLICATIONS

This application claims the benefit of Patent App. No. PCT/EP2015/002441 filed Dec. 3, 2015.

BACKGROUND

Field Of The Invention

The invention is related to a method and vibratory apparatus for the improved solid-liquid filtration of filter cakes, especially for dewatering finely divided thixotropic filter cakes, with the aid of a vibratory apparatus. Further, the invention relates to a filtration apparatus having a vibratory apparatus as described herein, and to the use of the vibratory apparatus for the solid-liquid filtration of filter cakes.

Technological Background Of The Invention

Finely divided or nanoparticulate filter cakes are insufficiently filtered by means of conventional filtration apparatus, such as drum filters, suction filters, planar rotary filters, filter presses, automated plate filters, or pressure filters. This applies, in particular, to thixotropic filter cakes as obtained, inter alia, in the production of titanium dioxide, iron oxide, aluminum oxide or silicon dioxide, and in waste water treatment and in the paper industry.

In the production of titanium dioxide, products from titanium oxide hydrates and suspensions of titanium oxide in water, in particular, are filtered and washed using the mentioned filtration apparatus, wherein adjustment of the pH, especially in the range around the isoelectric point, may also be effected selectively during the washing. The dewatering of such filter cakes is usually effected by vacuum filtration. However, the moisture content can be reduced only slightly and only in a limited way in such cases despite the application of reduced pressure on the filtrate side or the application of overpressure on the top side of the filter cake of the filtration apparatus.

The established method of vibratory dewatering increases the degree of dewatering of a filter cake by causing the filtration apparatus to vibrate. Thus, DE 198 30 943 (See U.S. Pat. No. 3,622,005) discloses a method for dewatering wet ash from pulverized coal firing by applying the wet ash to a vibratory dewaterer. This vibratory dewaterer is a vibratable sieve pan provided with a vibratory drive in which a sieve bottom is arranged and which is provided with an ejecting apparatus. However, this method is not suitable for the above mentioned applications, especially for very finely divided or nanoparticulate and/or thixotropic filter cakes.

Therefore, there is a need in the art for a method by which the afore-mentioned drawbacks can be overcome.

BRIEF DESCRIPTION OF THE INVENTION

It is the object of the invention to provide an improved method and a corresponding apparatus for the solid-liquid filtration of finely divided or nanoparticulate, especially thixotropic, filter cakes.

This object is achieved by a method for the improved solid-liquid filtration of a filter cake in a filtration apparatus, characterized in that a vibratory apparatus causes only a part of the filter cake to vibrate.

This object is further achieved by a vibratory apparatus for the improved solid-liquid filtration of a filter cake in a filtration apparatus, characterized in that said vibratory apparatus comprises at least one vibratory body, at least one connecting part, and at least one vibratory drive, wherein said at least one connecting part is connected with said at least one vibratory body on the one hand, and with said at least one vibratory drive on the other, and wherein said at least one connecting part is decoupled from the housing of the filtration apparatus, and wherein said at least one vibratory body contacts or protrudes into the filter cake and causes only part of the filter cake to vibrate.

Therefore, in a first aspect, the invention relates to a method for the improved solid-liquid filtration of a filter cake in a filtration apparatus, characterized in that a vibratory apparatus causes only a part of the filter cake to vibrate.

In another aspect, the invention relates to a vibratory apparatus for the improved solid-liquid filtration of a filter cake in a filtration apparatus, characterized in that said vibratory apparatus comprises at least one vibratory body, at least one connecting part, and at least one vibratory drive, wherein said at least one connecting part is connected with said at least one vibratory body on the one hand, and with said at least one vibratory drive on the other, and wherein said at least one connecting part is decoupled from the housing of the filtration apparatus, and wherein said at least one vibratory body contacts or protrudes into the filter cake and causes only part of the filter cake to vibrate.

In a still further aspect, the invention relates to a filtration apparatus comprising the vibratory apparatus described herein.

Finally, in another aspect, the invention relates to the use of the vibratory apparatus as described herein in the production of titanium dioxide, paper, and in waste water treatment.

Further advantageous embodiments of the invention are stated in the dependent claims.

BRIEF DESCRIPTION OF THE FIGURES

For a more complete understanding of the present invention and for further advantages thereof, reference is now made to the following description taken in conjunction with the accompanying drawings in which.

DESCRIPTION OF THE PREFERRED EMBODIMENTS

Figure 1:
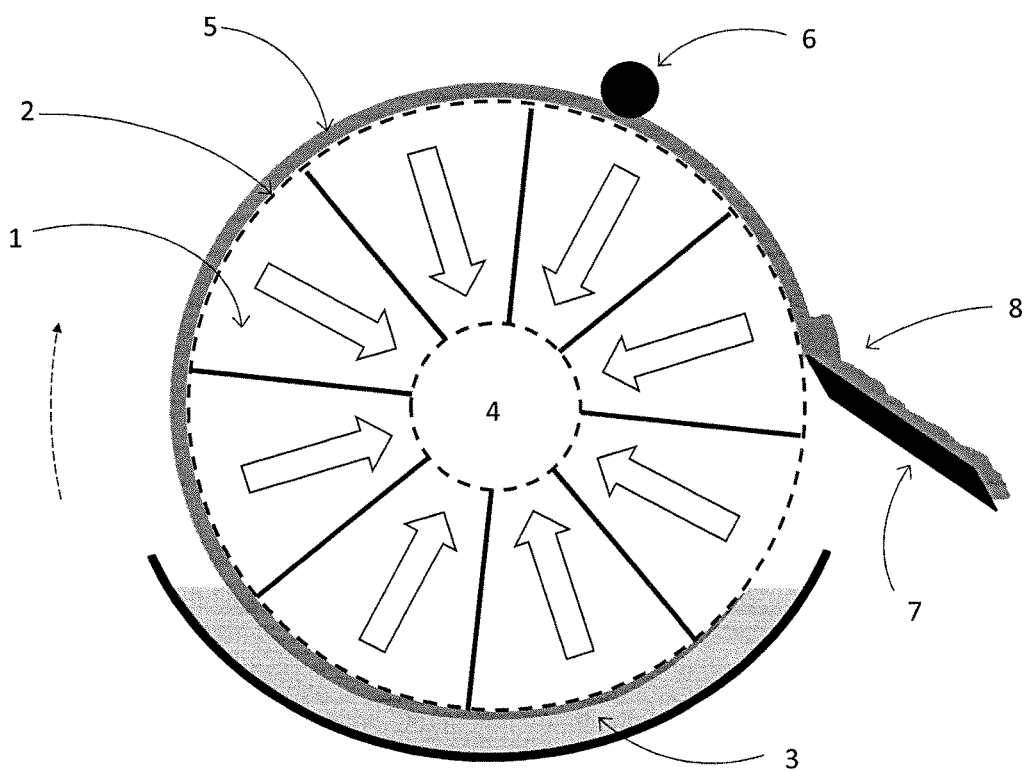
FIG. 1 is a cross section view of a schematic representation of a preferred embodiment of the invention that is a vacuum drum filter with vibratory body apparatus.

These and other aspects, features and advantages of the invention become obvious to the skilled person from the study of the following detailed description and claims. Each feature from one aspect of the invention can be employed in any other aspect of the invention. Further, it is a matter of course that the Examples contained herein are meant to describe and illustrate the invention, but without limiting it, and that the invention is not limited to these Examples, in particular. Numerical ranges stated in the format "from x to y" include the mentioned values and the values that are within the respective measuring Accuracy as known to the skilled person. If several preferred numerical ranges are stated in this format, it is a matter of course that all ranges formed by the combination of the various end points are also included. The term "about" with respect to numerical values and/or ranges is intended to capture the full range of measuring accuracy and uncertainty ranges of standard commercial tests.

Unless explicitly stated otherwise, all percentages stated in connection with the compositions herein described refer to percent by weight, respectively based on the mixture or composition in question.

"At least one" as used herein means 1 or more, i.e., 1, 2, 3, 4, 5, 6, 7, 8, 9, or more.

In the filtration of a solid-liquid mixture of substances on a filter medium (filter), an on-growing layer of the separated solid builds on the filter with time, the so-called filter cake, which is responsible for the major part of the overall pressure loss between the application side and the filtrate side of the filtration apparatus. The continuous structure of the filter cake leads to a flow resistance (pressure loss) that increases with time, so that less and less liquid (solvent) is separated off. In the case of cake-forming filtration, such a filtration is performed with a filter medium whose pore opening is larger than the particle diameters of the particles to be separated off. The actual filtering function is performed by the filter cake itself, which is why this is also referred to as cake filtration. The filter cake consists of the particles to be separated off, which are present in an approximately close packing, depending on their particle diameter. The pores of such a filter cake are mostly smaller than the particles to be separated. This is an absolute filter, which is based on the principle of depth filtration. Usually, the liquid content in the filter cake approximates a substance-dependent limit asymptotically, with the progressing filtration time. Especially filter cakes constituted by finely divided or nanoparticulate particles have a high flow resistance even for low filter cake heights because of their close particle packing, whereby high specific amounts of liquid remain in the filter cake, and these are very hard to remove even when high pressure differences over the filter cake are applied.

According to the present invention, only a part of the filter cake is caused to vibrate. This part of the filter cake thereby undergoes structural disruption and refluidization, and the viscosity of this portion of the filter cake is substantially reduced. Preferably, this part is the part of the filter cake facing the flow side. The reduced viscosity results in a lower flow resistance and thus in an improved filtration performance in terms of removing the solvent from the filter cake (demoisturization, dewatering). During the refluidization, the solid particles become rearranged, so that the liquid deposited between the particles (e.g., capillary or interstitial water or aqueous solution, other solvent or mother liquor) leaks out. In this way, the liquid becomes more accessible to the filtration method and can be separated off because of the existing pressure difference between the top side of the filter cake and the filtrate side of the filtration apparatus. The unmoved lower part of the filter cake, which was not caused to vibrate, i.e., the part of the filter cake that is in immediate contact with the filter medium and essentially retains its original structure, prevents or minimizes, in its function as an absolute filter, the breakthrough of the particles from the refluidized part of the filter cake through the filter medium towards the filtrate.

According to the invention, part of the filter cake facing the flow side is caused to vibrate by at least one vibratory apparatus. The at least one apparatus comprises at least one vibratory drive, at least one connecting part, and at least one vibratory body. In different embodiments, said apparatus respectively has one vibratory drive, one connecting part, and one vibratory body. The vibratory apparatus is decoupled from the housing of the filtration apparatus, or attached at the housing of the filtration apparatus with so much damping that the filtration apparatus itself cannot be caused to vibrate by the vibratory apparatus. For example, the vibratory apparatus is attached outside the filtration apparatus, or it is attached at the filtration apparatus through a floating mounting. The vibratory body contacts, or protrudes into part of, the filter cake to be filtered and is connected with the vibratory drive through the connecting part (e.g., a supporting bar). Preferably, the upper part of the filter cake is caused to vibrate. The upper part of the filter cake is the part facing the flow side.

According to the invention, the vibratory body can have different shapes, which depends on the design of the filtration apparatus, as long as these bodies are capable of transmitting the vibration in a defined way onto or into the filter cake. The vibratory body can have a circular, oval or angular shape, such as a triangular, quadrangular, pentagonal or hexagonal shape in cross section. The surface can be smooth or structured. For example, the vibratory bodies can be surface-structured plates provided with a fin or knob structure and optionally with a pressure rib. In one embodiment of the invention, the vibratory body may be a segmented roller or a rod with applied fin structure.

The vibratory body is preferably provided with a pressure rib. The pressure rib has the function, inter alia, to resolidify the loosened or refluidized filter cake, to close existing canals in the filter cake, and to press the filter cake against the filter medium. In one embodiment, the pressure rib vibrates together with the vibratory body. In an alternative embodiment, the pressure rib is attached rigidly to the filtration apparatus independently of the vibratory body. In another alternative embodiment, the pressure rib can be connected with its own vibratory drive. The pressure rib has a smooth surface.

According to the invention, several vibratory apparatuses may be mounted on one filtration apparatus, wherein the vibratory bodies and the pressure ribs are connected with a common vibratory drive, or are each connected with their own vibratory drives.

The vibratory apparatus according to the invention can be employed with usual filtration apparatuses, for example, with drum filters, suction filters, planar rotary filters, filter presses, automated plate filters, or pressure filters. In addition, a vacuum or overpressure can be applied to enhance the filtration performance. In particular, vacuum drum filters are suitable, as are frequently employed in the dewatering of titanium oxide hydrate, and are basically employed in the filtration of filter cakes, which consist, for example, of particles smaller than 15 µm or have thixotropic properties.

The vibratory apparatus is moved in at least one direction relative to the filter cake. The vibratory drive may be, for example, one or more sonotrodes, crankshaft or unbalance drives. The vibration frequency and the amplitude are determined by the quality of the filter cake. The vibration frequency is preferably within a range of from 1 to 2000 Hz, preferably from 50 to 500 Hz, and more preferably from 100 to 200 Hz. The amplitude of the vibration is preferably within a range of from 0.01 to 20 mm, more preferably from 0.2 to 5 mm, and most preferably from 1 to 3 mm.

The depth by which the vibratory body protrudes or plunges into the filter cake depends, according to the invention, on the quality of the filter cake. The penetration depth must be selected in such a way that a part of the filter cake that is in immediate contact with the filter medium is not fluidized, and thus the breakthrough of the solid through the filter medium is prevented or minimized. In a particular embodiment of the invention, when the vibratory excitation of the filter cake is in parallel or tangential to the surface of the filter cake, the penetration depth is from 2% to 85% of the thickness of the filter cake, preferably from 5% to 50%, and more preferably from 20% to 30%.

If the vibratory excitation is effected perpendicular to the filter cake, the penetration depth of the vertical amplitude of the vibratory body must be adapted accordingly to ensure the same proportion of the filter cake in a non-fluidized form as in the parallel or tangential excitation.

Figure 2:
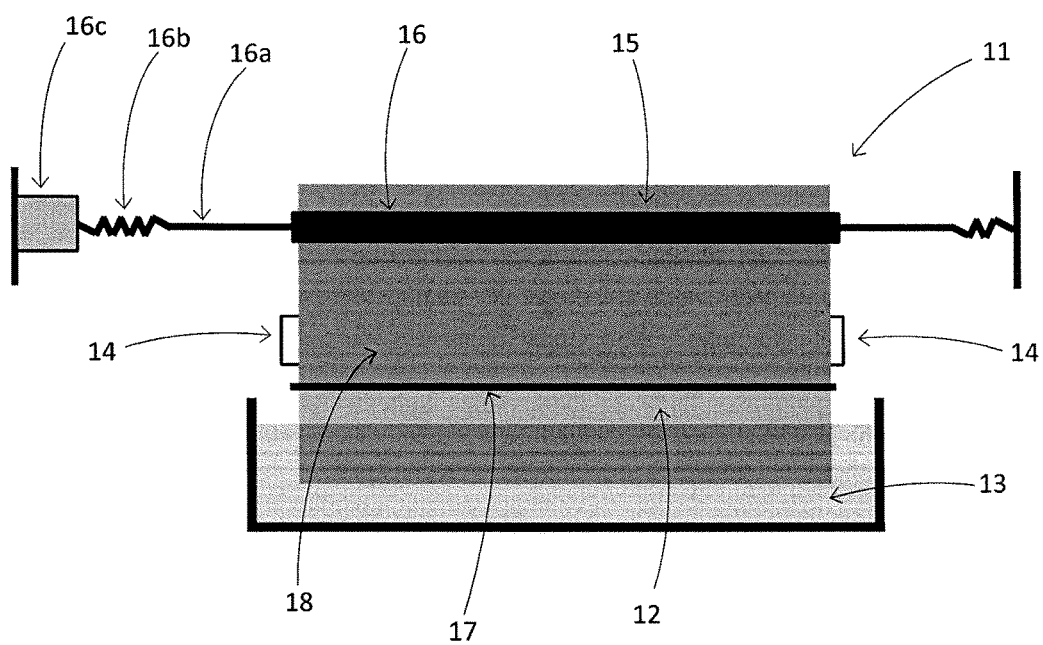
FIG. 2 is a longitudinal section view of a schematic representation of the preferred embodiment of the invention depicted in FIG. 1.

In FIG. 1 and FIG. 2, the arrangement and functionality of the vibratory apparatus according to the invention is explained using a vacuum drum filter, by way of example. The skilled person is capable of transferring the vibratory apparatus according to the invention to other usual filtration apparatus as well.

FIG. 1 shows a section crossways to the longitudinal axis of a vacuum drum filter apparatus (1) with a filter medium (filter cloth) (2). The drum rotates clockwise in a tank with the suspension to be filtered (3). The filtrate suction (4) is effected within the drum by means of the applied vacuum. The filter cake (5), into which a vibratory body (6) penetrates, forms on the filter medium. The vibratory body is represented here schematically as the section of a roller. Behind, in the direction of rotation, the vibratory body (6), there is a scraper (7), which removes the filtered and dewatered filter cake (8) from the filter medium (2). Optionally, a washing apparatus for the filter cake may be provided ahead, in the direction of rotation, of the vibratory body (6).

FIG. 2 shows a longitudinal section of a vacuum drum filter apparatus (11) with a filter medium (12) according to FIG. 1. The direction of rotation of the drum is from top rear to bottom front. The drum immerses into the suspension (13) to be filtrated, and a filter cake (15) forms on the filter medium (12). The channel for the sucked-off filtrate (14) runs centrally in parallel to the longitudinal axis of the drum. The vibratory apparatus consists of the vibratory body (16), which is in contact with or penetrates into the filter cake, the connecting part (16a, supporting bar), a damping element (16b), and a vibratory drive (16c), which is realized, for example, by an unbalance motor. Behind, in the direction of rotation, the vibratory body (16), the scraper (17) is provided, which removes the filtered and dewatered filter cake (18) from the filter medium (12).

Figure 3A:
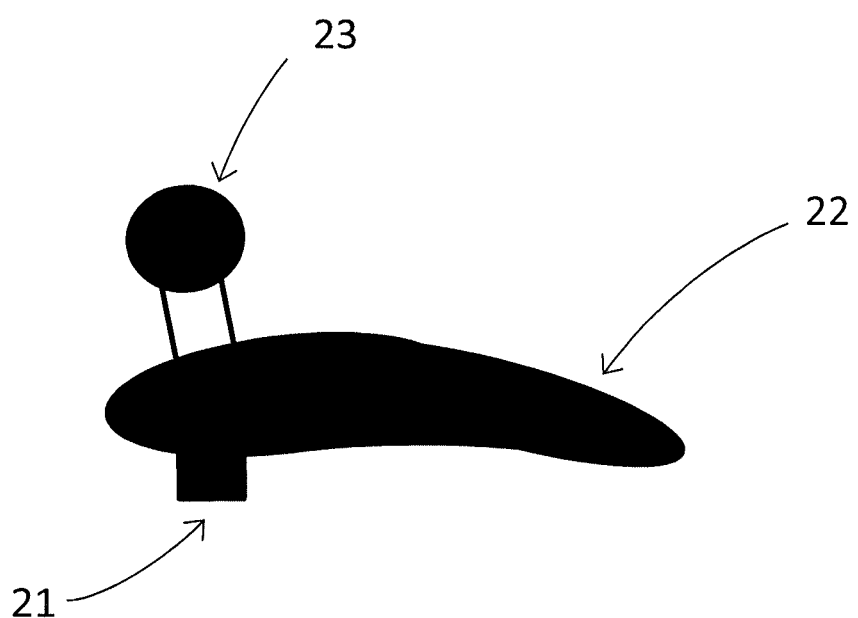
FIG. 3A is a cross sectional view of a first preferred embodiment of the vibratory body of the current invention.

FIG. 3a shows a cross-sectional view of a possible embodiment of the vibratory body according to the invention by way of example: the vibratory body (21) penetrating into the filter cake, and a pressure rib (22). The vibratory body is firmly connected with the connecting part (23), for example, a supporting bar.

Figure 3B:
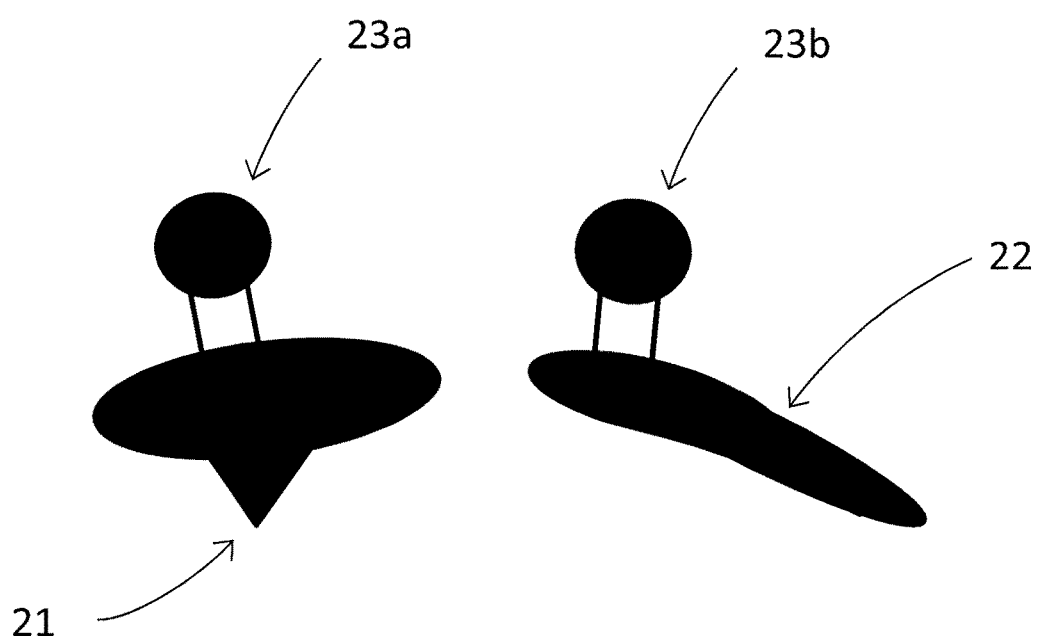
FIG. 3B is a cross sectional view of a second preferred embodiment of the vibratory body of the current invention.

FIG. 3b shows a cross-sectional view of another possible embodiment of the vibratory body and the pressure rib by way of example, wherein the vibratory body (21) and the pressure rib (22) are formed separately and are respectively connected with a separate connecting part (23a and 23b).

Figure 3C:
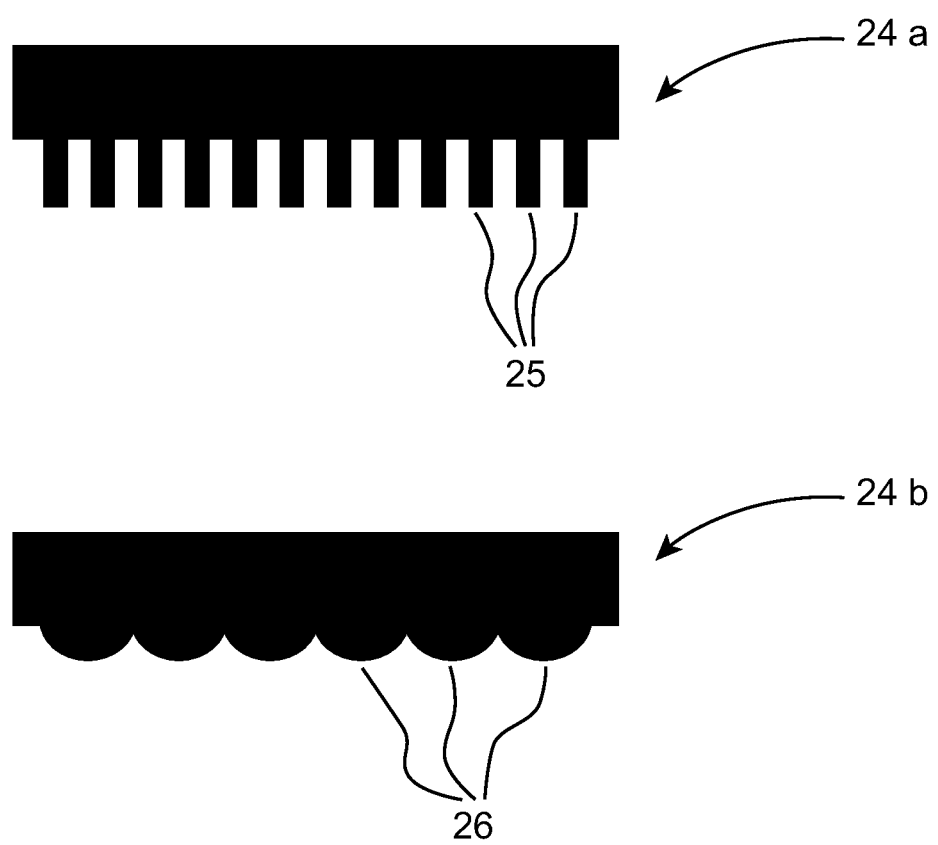
FIG. 3C is a cross sectional view of a third preferred embodiment of the vibratory body of the current invention.

FIG. 3c shows longitudinal sections of possible embodiments of the vibratory body (24a and 24b) with a fin (25) and knob (26) structure by way of example.

Figure 3D:
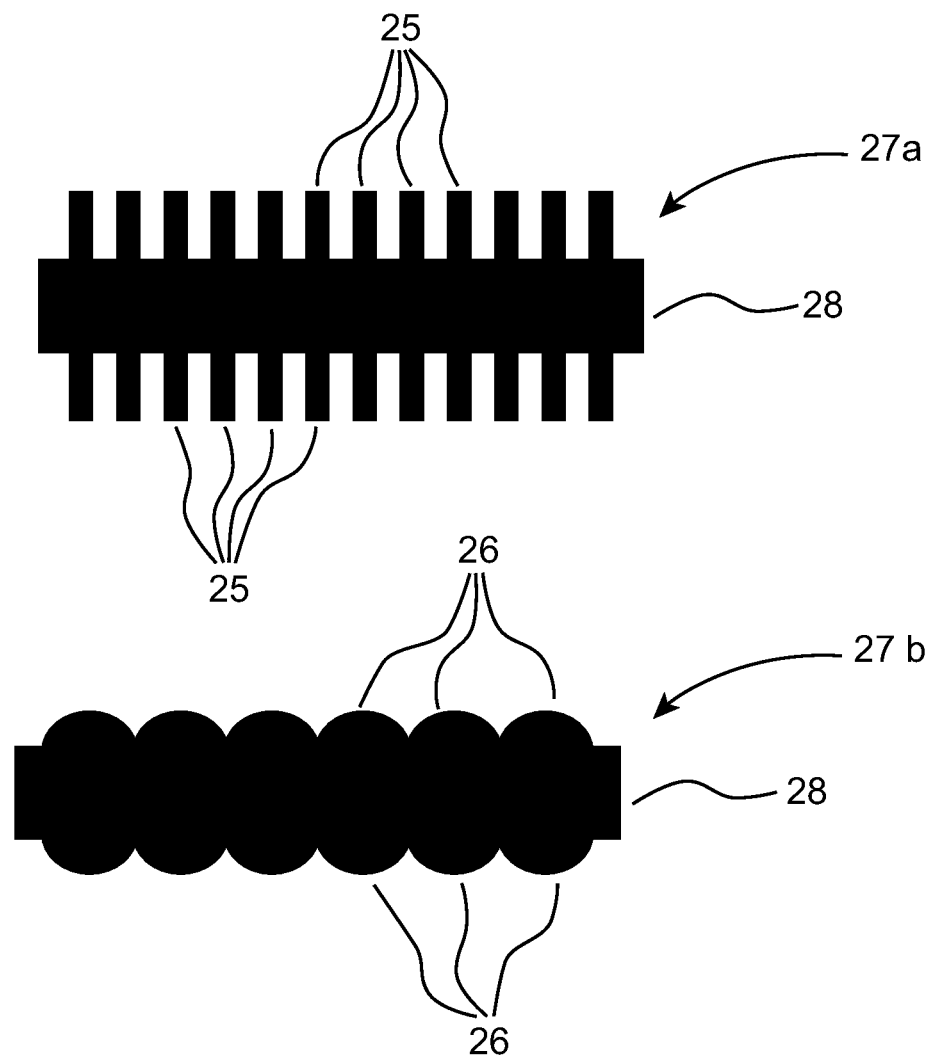
FIG. 3D is a cross sectional view of a fourth preferred embodiment of the vibratory body of the current invention.

FIG. 3d shows the vibratory bodies (27a and 27b) in the form of rollers (28) with fin (25) and knob (26) structures. In further specific embodiments, the rollers may have a rotary design, wherein the direction of rotation of the roller is realized in the same sense or against the direction of transport of the filter cake.

The filtration method according to the invention and the vibratory apparatus are suitable, in particular, to be applied in titanium dioxide production, paper production, and waste water treatment. Therefore, in another aspect, the invention relates to the vibratory apparatus according to the invention in the production of titanium dioxide, paper, and in waste water treatment.

In another aspect, the invention relates to a filtration apparatus characterized by having a vibratory apparatus as herein described. Without limitation, the filtration apparatus is selected from the group consisting of a drum filter, vacuum drum filter, suction filter, planar rotary filter, filter press, automated planar filter, and pressure filter.

Using the invention, the filtration time, which corresponds to the dewatering time to a particular degree of dewatering, can be clearly shortened even without the use of filtering aids. Further, while the dewatering time remains the same, the filtrate or solvent (e.g., moisture) remaining in the filter cake can be further reduced. In addition, the method according to the invention is more energy-efficient as compared to established methods, which use vacuum technology and a significantly higher pressure difference. Filtration apparatuses can be retrofitted with the vibratory apparatus herein described without undue reconstruction measures.

EXAMPLES

The invention is illustrated by means of the following Example.

Comparative Example

A vacuum filtration apparatus (experimental suction filter) was covered with a tight filter cloth of the company Markert (type PP 2455). While a vacuum with a pressure difference of 200 mbar was applied, 1 kg of thixotropic titanium oxide hydrate filter cake was filtered on this apparatus.

The initial moisture of the applied material was 55% by weight, the final moisture after 10 minutes of filtration was 53% by weight, based on the total mass. The thickness of the filter cake was determined to be 20 mm.

Example

A similar filter cake was filtered under the same conditions as in the Comparative Example, but additionally using a vibratory apparatus according to the invention. The vibratory excitation was effected in parallel or tangentially, and the vibration frequency was 180 Hz, and the vibration amplitude was 2.3 mm. The penetration depth of the vibratory body having a surface with a fin structure into the filter cake was 40% of the thickness of the filter cake. The initial moisture of 55% by weight had decreased to 50.5% by weight, based on the total mass, already after 5 minutes of filtration.

The above descriptions of certain embodiments are made for the purpose of illustration only and are not intended to be limiting in any manner. Other alterations and modifications of the invention will likewise become apparent to those of ordinary skill in the art upon reading the present disclosure, and it is intended that the scope of the invention disclosed herein be limited only by the broadest interpretation of the appended claims to which the inventors are legally entitled.

What is being claimed is:

1. A filter apparatus capable of vibrating accumulated filter cake for improved solid-liquid filtration of a suspension, said apparatus comprising:
 a housing for containing a suspension to be filtered;
 a filter mounted in said housing and accumulating a filter cake as a filtrate passes through a filter surface of said filter;
 a vibratory apparatus unconnected to said housing, including:
  a vibratory body positioned to contact or protrude into the filter cake so that only a portion of the filter cake thickness vibrates;
  a pressure rib connected to said vibratory body;
  a connecting part; and
  a vibratory drive operatively connected to the vibratory body by said connecting part to cause said vibratory body to vibrate.

2. The filter apparatus of claim 1, wherein the vibratory drive is selected from the group consisting of a sonotrode, crankshaft drive, and unbalance drive.

3. The filter apparatus of claim 1, wherein the vibratory body has a cross sectional shape selected from the group consisting of oval, circular and angular shapes.

4. The filter apparatus of claim 1, wherein the vibratory body comprises a fin or a knob structure.

5. The filter apparatus of claim 1, further comprising a scraper.

6. The filter apparatus of claim 1, further comprising a washing apparatus for washing the filter cake.

7. The filter apparatus of claim 1 wherein the filter is a rotary drum filter.

* * * * *